July 21, 1959
D. W. LYSETT
2,895,581
FRICTION CLUTCHES
Filed May 8, 1956
2 Sheets-Sheet 1
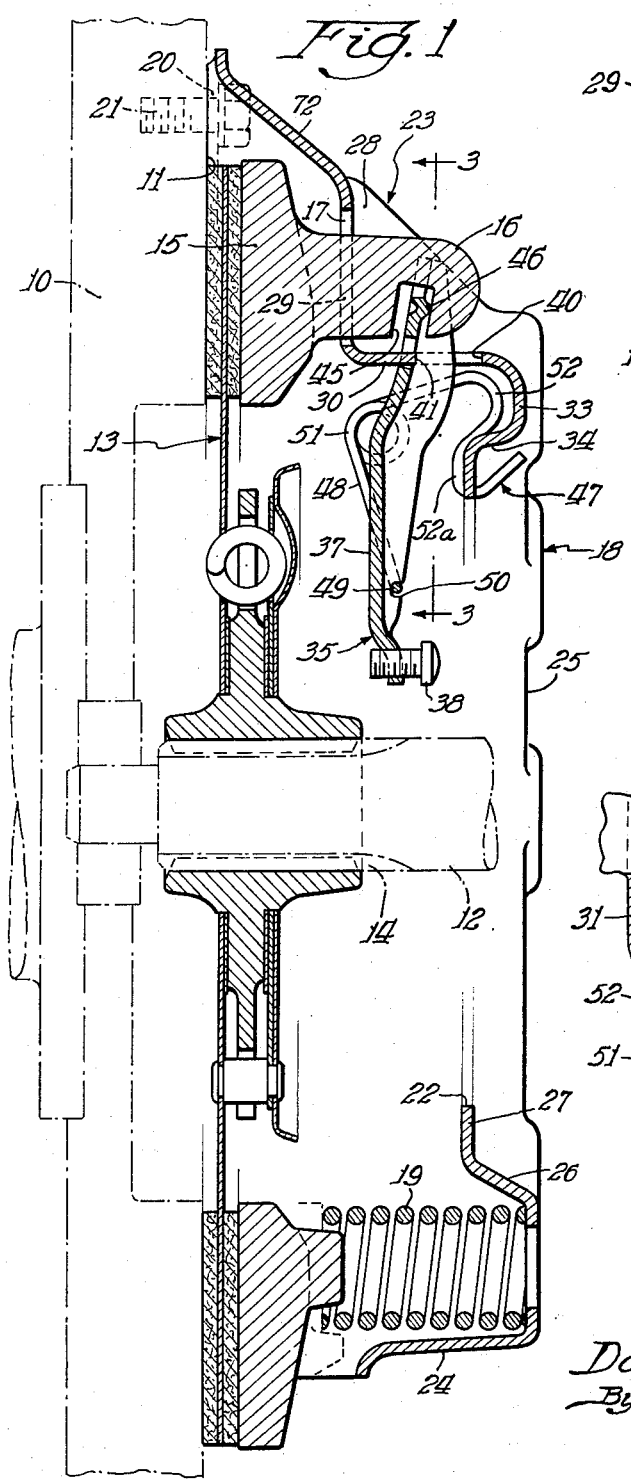
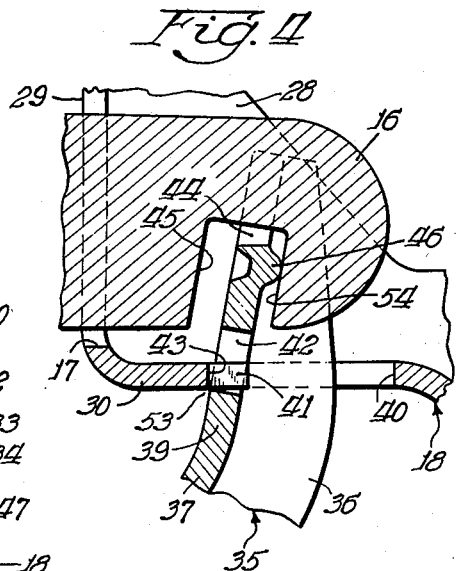
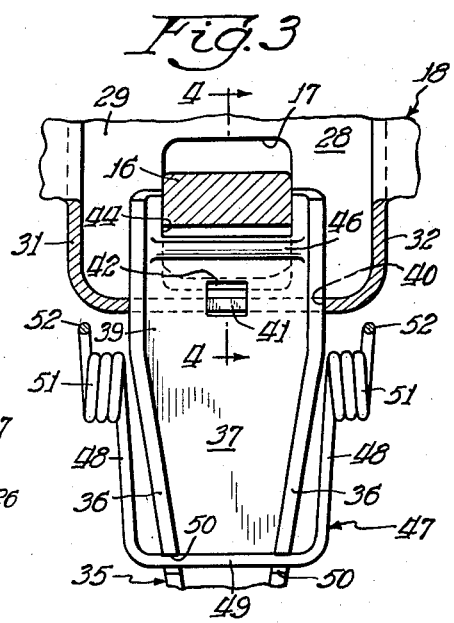
Inventor:
Daniel W. Lysett
By:
H. J. Schmid Atty.

July 21, 1959 D. W. LYSETT 2,895,581
FRICTION CLUTCHES
Filed May 8, 1956 2 Sheets-Sheet 2
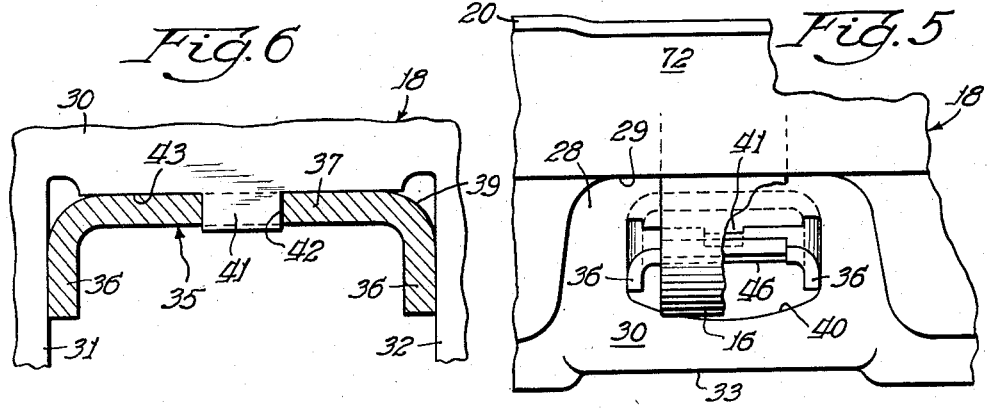
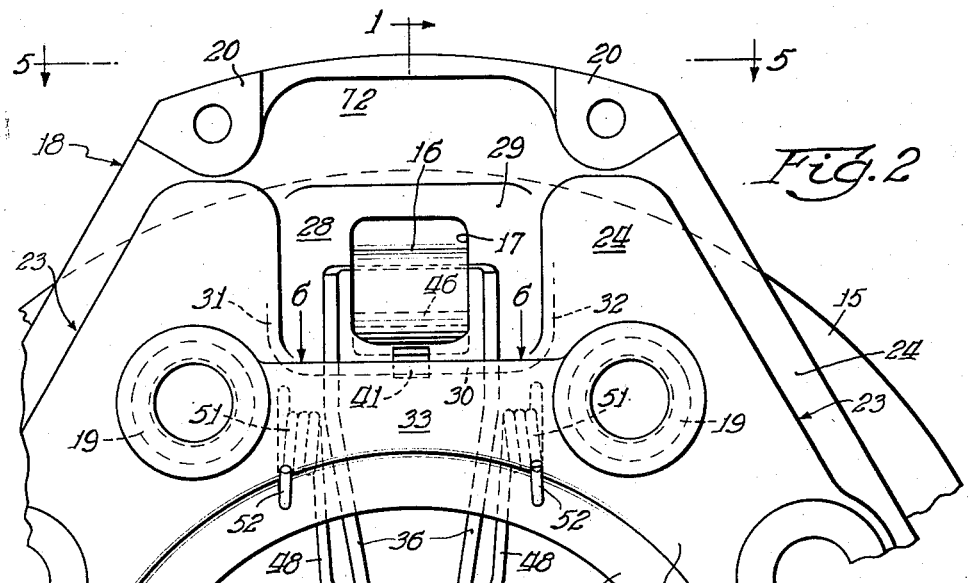
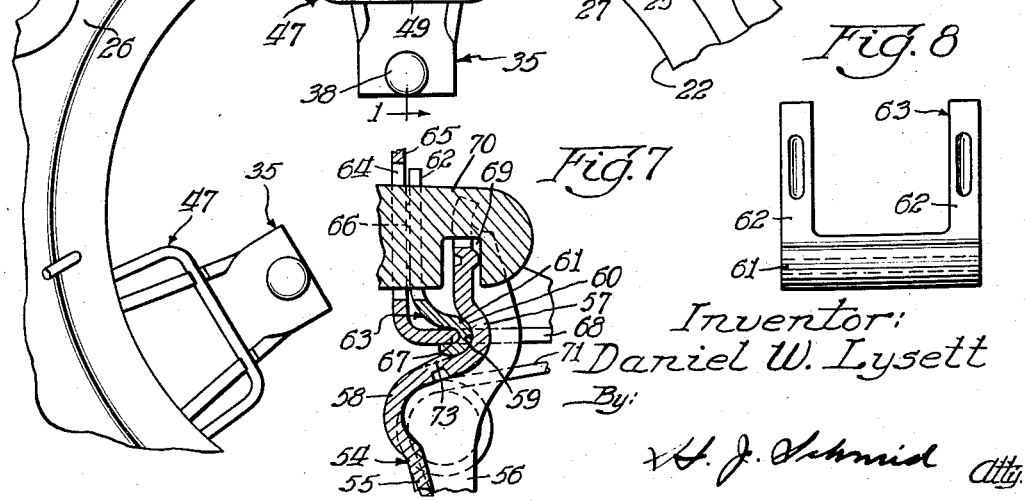
Inventor:
Daniel W. Lysett
By H. J. Schmid Atty.

United States Patent Office 2,895,581
Patented July 21, 1959

2,895,581
FRICTION CLUTCHES

Daniel W. Lysett, Utica, Mich., assignor to Borg-Warner Corporation, Chicago, Ill., a corporation of Illinois Application May 8, 1956, Serial No. 583,526

4 Claims. (Cl. 192—99)

This invention relates to friction clutches of the type employed in motor vehicles.

An object of the invention is to provide improved friction clutches of simple, inexpensive and lightweight construction and having a high degree of efficiency in operation.

Another object of the invention is to provide simple and economical improved clutch constructions including a pressure plate, a stamped sheet metal cover plate, stamped sheet metal levers connected to and fulcrumed on the cover plate and engaging drive lugs on the pressure plate to operate the pressure plate, and a plurality of springs holding the levers in assembly with the cover and pressure plates.

Another object of the invention is to provide improved clutches including a cover plate affording fulcrum portions for a plurality of clutch-control levers engaging a pressure plate, and having spring-supporting portions for retaining springs holding the levers in assembly with the cover plate and in operative relation to the pressure plate, the pressure plate having drive lugs extending through openings in the cover plate and receiving the levers operating the pressure plate.

Another object of the invention is to provide an improved clutch as described wherein the fulcrums on the cover plate for the levers are located closely adjacent to the pressure plate drive lugs to obtain maximum lever ratios during operation of the levers to actuate the pressure plate, the lugs having slots therein receiving the levers with surfaces of the slots being angularly inclined to a radial plane normal to and converging toward the axis of the clutch to insure constant engagement of the levers with the drive lugs during operation of the levers, and to minimize change in lever height from wear of the driven member.

A further object is to provide an improved lever-mounting means comprising a cover plate having an opening and a tongue projecting therein for reception in an opening in the lever with the tongue engaging the lever, and an edge of the opening in the cover plate engaging the lever providing a knife edge fulcrum for the lever.

Another object of the invention is to provide a lever-mounting means as described in which the tongue cooperates with the lever to maintain the desired lever ratio by restraining the lever from moving outwardly of the cover plate by centrifugal force and provides the additional function of keeping the lever from displacement from the cover plate should the retaining lever spring break.

A still further object of the invention is to provide an improved clutch including a clutch operating lever arrangement featuring a lever-mounting and fulcruming member connected to the cover plate and providing reinforcement of the cover plate by affording a fulcrum of substantial area capable of wide distribution of the load placed on the cover plate by the lever operation and, in addition, permitting the use of greater clutch-engaging spring pressures.

Additional objects, aims, and advantages of the invention, contemplated herein will be apparent to persons skilled in the art after the construction and operation of the clutch assembly is understood from the following description. It is preferred to accomplish the objects of this invention, and to practice the same in substantially the manner hereinafter fully described and as more particularly pointed out in the appended claims. Reference is now made to the accompanying drawings forming a part of the specification.

In the drawings.

Fig. 1 is a central axial section of a clutch assembly of the present invention, the view being taken substantially of the line 1—1 of Fig. 2 and showing the relative positions of the clutch parts during engagement of the clutch.

Fig. 2 is a fragmentary plan view, partially broken away, of the clutch shown in Fig. 1, looking at the clutch from the rear;

Fig. 3 is a sectional view, taken as indicated by the line 3—3 of Fig. 1, showing the clutch release lever and associated parts;

Fig. 4 is a sectional view taken on line 4—4 of Fig. 3;

Fig. 5 is an edge view taken as indicated on the line 5—5 of Fig. 2;

Fig. 6 is an enlarged fragmentary portion of the cover plate and lever-mounting arrangement;

Fig. 7 is a sectional view of a modification of the cover plate and lever-mounting arrangement shown in Figs. 1–6, inclusive, and Fig. 8 is a rear view of the lever-mounting saddle shown in Fig. 7.

The drawings are to be understood as being more or less of a schematic character for the purpose of disclosing typical or preferred forms of the improvements contemplated herein, and in these drawings like reference characters identify the same parts in the several views.

Referring to the drawings, and particularly to Figs. 1 and 2, the clutch assembly includes a flywheel 10 having a clutch face 11, a transmission or output shaft 12, a driven clutch disc indicated generally at 13 and secured upon the splined end 14 of the transmission shaft 12, and a pressure plate 15 having drive lugs 16 extending within openings 17 in a cover plate 18 secured to the flywheel 10. A plurality of coil springs 19 are disposed between and have their opposite ends engaging the cover plate and the pressure plate to normally urge the pressure plate into engagement with the driven clutch disc 13 to effect engagement of disc 13 with the flywheel 10 and the pressure plate 15 to transfer drive from the flywheel 10 to the driven shaft 12. The flywheel 10 transmits drive to the cover plate 18, which through its connection to the pressure plate 15, rotates the pressure plate 15. The drive lugs 16 of the pressure plate, positioned within the openings 17 in the cover plate 18, engage opposite sides of the openings 17 to provide a driving connection between the cover plate and the pressure plate, while permitting movement of the pressure plate axially of the cover plate.

The cover plate 18 is preferably a heavy sheet metal stamping comprising a body portion of dish-shaped section and an outwardly flared flanged marginal portion including attaching flanges 20 secured to the flywheel 10 by bolts 21. The central portion of the cover plate has a circular opening 22 of sufficient size to provide clearance for the driven shaft 12 and other instrumentalities of the clutch mechanism.

The cover plate is of polygonal shape of somewhat triangular form having sides or chordal portions 23 separated by the flanges 20 lying in a common plane and attached to the flywheel. Each chordal portion 23 is formed of an arch or arcuate shape to bridge the pressure plate 15 and comprises a wall 24 angularly inclined to a radial plane intersecting the axis of the plate and extending from the flanged marginal portion to the rear or bottom wall 25 of the cover plate, the wall 25 extending radially inwardly and merging with an angularly inclined wall 26 connected to a radially inner wall 27 having its peripheral edge defining the opening 22.

The wall 72 is provided with a plurality of pockets 28, each pocket being defined by angularly disposed respectively radially and axially extending flat walls 29 and 30 merging with side walls 31 and 32, the wall 29 merging with the inclined wall 72 and the wall 30 merging with a radially extending wall 33, connected to the radially inner and extending wall 27 by an axially extending wall 34.

The rear wall 25 of the cover plate provides seats for springs 19 engaging and compressed between the seats and the pressure plate for normally urging and holding the pressure plate in engagement with the driven plate to provide a driving connection between the flywheel and the driven shaft. It will be noted by an inspection of Figs. 1 and 2 that the walls 29 of the pocket portions of the wall 72 are provided with the substantially square openings 17 for receiving the lugs 16 on the pressure plate, the side edges of the walls 29 partly defining the openings 17 and engaging the sides of the lugs to transmit drive from the cover plate to the pressure plate while allowing axial movement of the pressure plate.

The clutch is provided with a plurality of control lever assemblies supported on the cover plate and engaging the pressure plate to move the pressure plate axially toward the cover plate, against the pressure of the springs to disengage the pressure plate from the driven disc assembly and thereby release a driving connection between the flywheel and the driven shaft.

Each of these lever assemblies comprises a lever 35 formed as a sheet metal stamping and generally channel-shaped in cross-section to provide re-enforcing side flanges 36, 36 at opposite sides of the body portion 37 of the lever and converging radially inwardly of the lever. The body portion of the lever has its radially inner extremity provided with a button 38 secured thereto and engageable with a release collar (not shown), and the lever body portion extends radially outwardly to an angularly offset fulcrum section 39 (Fig. 4) extending through a substantially rectangular opening 40 in the wall 30 of the cover plate, the wall 30 having a tongue 41 projecting into the opening 40 and received with an opening 42 in the lever. The edge 43 of the wall 30 defines a side of the opening 40 in the wall 30 with tongue 41 projecting therefrom and positioned within the opening in the lever to prevent radially outward movement of the lever and to perform other functions to be described hereinafter. The radially outer end of each lever is preferably recessed at 44 by terminating the body portion inwardly of the flanges 36, 36 so that the recess in the lever and between the flanges 36, 36 receives a lug 16 on the pressure plate.

The body portion of the lever extends into a slot 45 in the lug 16 of the pressure plate and adjacent the recess 44 in the lever, and the lever is upset to provide a transverse rib 46 extending between and merging with the side flanges 36, 36 of the lever, the rib 46 having an arcuate face contacting a flat surface on the lug 16 and defining one side of the slot therein.

This side fit of the lever on the lug adds stability to the lever and provides a restraining means for the lever to oppose the rotational drag introduced when the throwout bearing contacts the buttons. It also, in this design, provides proper alignment between the fulcrum point of the lever on the cover and the contact of the rib in the lever on the pressure plate slot surface. In other words, the lever slot locates the lever with respect to the sides of the pressure plate drive lugs to maintain parallelism of the bearing contact points on the knife edge of the cover and the surface of the drive lug with the rib.

Each lever is held in position on the cover plate by the tongue 41 of the cover plate engaging the lever, and by a torsion spring 47 effective to maintain the lever in position and in operative relation to the tongue 41 and the pressure plate. More particularly, the spring 47 is of substantially U-shape to straddle the lever and includes a pair of spaced arms 48, 48 connected by a cross piece 49 positioned within notches 50 in the side flanges of the lever, the spring having coils 51, 51 at the outer portions of the arms terminating with reversely bent S-shaped hooks 52, 52 at their extremities, portions of the hooks extending about and engaging the radially inner edge of the cover plate defining the central opening therein, with the portions 52a, 52a of the ends of the arms 52, 52 extending in a radial plane parallel to the wall 27 of the cover plate and engaging the wall. The spring coils 51, 51 are compressed by the ends of the arms 52, 52 engaging the cover plate, and the cross piece 49 engaging the levers, to provide a suitable tension of the spring in the assembly of the clutch, with the tension of the spring being effective to eliminate slack in the parts and varying only slightly during operation of the lever. It is contemplated that three lever assemblies be used with the clutch and nine coil springs 19 so that the springs 47 will only slightly affect the pressure spring loading of the clutch.

It will be apparent from an inspection of the drawings that each spring 47, in its assembly with the cover plate and the lever, will cause the coils of the spring to be compressed to an extent that the arms 48, 48 and 52, 52 on opposite sides of the spring will have the coil pressure applied to them to move the arms 48, 48 apart from the arms 52, 52 with the result that the resultant tension will cause the radially outer arms 52, 52 to be flexed to insure the S-shaped portions at the extremity of these arms to firmly engage the cover plate, with the active force of the coils being exerted upon the radially inner arms 48, 48 and cross piece 49 to provide a force attempting to move the lever radially outwardly but which will be prevented by the tongue 41 on the cover plate. It will be seen from an inspection of Fig. 4 that the radially inner edge of the opening 40 in the cover plate wall 30, on opposite sides of the tongue 41, has a line contact with the radially inner terminal edge of the portion of the lever, defining the opening 42 therein, to provide a knife edge fulcrum 53 around which the lever can rotate and against which it is constantly held by the tension of the spring. The spring exerts force to rotate the lever in a clock-wise direction about the fulcrum, as seen in Figs. 1 and 4, and engages the arcuate surface of the rib 46 of the lever 35 with the flat surface of the lug 16 defining one side of the slot therein. Thus, the spring is effective to hold the lever in operative assembly with the cover plate and pressure plate. It will be apparent that, upon movement of the radially inner end of the lever towards the flywheel 10, the lever will rotate about the fulcrum 53 on the cover plate and, as the lever will move in a clock-wise direction, the rib 46 of the lever, engaging the slot in the pressure plate, will force the pressure plate in an axial direction away from the driven clutch disc 13 and against the pressure of the springs 19 to release the pressure plate from the driven disc and to disengage the clutch.

An important feature of the present invention is the location of the fulcrum point for the lever on the cover plate closely adjacent to the pressure plate drive lugs to obtain a maximum lever ratio during operation of the levers in retracting the pressure plate. A further feature of the invention is the formation of the drive lugs of the pressure plate with the slots in each drive lug inclined at an angle to a radial plane normal to the axis of the clutch to insure the constant engagement of the levers with the drive lugs, during the operation of the levers in releasing the clutch, and to minimize effect of the wear of the friction elements and knife edge 53. For this purpose, the slot is inclined at an angle as described and to the friction surface of the pressure plate at approximately a 10° angle. Thus, the surface 54 of the drive lug slot, inclined at the aforesaid angle, is effective, upon releasing movement of the levers, to cause the rib on the lever to slide along this surface during disengagement of the clutch and it will be apparent that by virtue of the inclination of the surface, that the lever ratio will be constantly maintained during the operation of the clutch, while, in addition, a much greater length of surface is provided for contacting the rib on the lever during operation of the clutch than if the surface were disposed in a radial plane normal to the axis of the clutch. While providing the aforesaid advantages, in the event of wear of the pressure plate, the inclined surface of the pressure plate lug will also provide a greater length of effective lever-engaging area than a surface normal to the axis of the clutch.

With respect to the inclined surface of the slot in the drive lug, it should be noted that the convergence of the plane described by this inclined surface is such that the convergence with the axis is toward the flywheel and thusly compensates for the deflection of the drive lug when releasing the clutch. For example, the 10° angle of the slot when holding the released position of the clutch may be only 5° and, were the slot milled radially, a surface condition would exist which would promote the ejection of the lever from the slot; therefore it is necessary that the angle be in the direction described to maintain an outward thrust on the lever rather than an inward.

The lever 35 is particularly described as having flanges which, of course, are not necessary to the design of the clutch. The flanges do permit the use of greater spring load but flat levers and the notches in the flanges of the levers which receive the torsion spring could just as well be accommodated in notches on the sides of flat levers by adding additional bends to the cross member of the torsion spring.

While the torsion spring 47 and its cooperation with the lever and cover plate have been described, it should be realized that it is quite possible that a leaf spring could be used which might be riveted to the cover stamping or slipped into a hole in the cover stamping somewhat the same as the torsion spring is and in the side view closely approximate the present torsion spring except that it would be located between the two flanges of the lever. A hook at the inner end of the spring could be located in a hole in the lever in approximately the same place as the notches in the rails of the lever.

Referring to the modification of the invention illustrated in Figs. 7 and 8, a clutch release lever 54 is provided having its body 55, between the side flanges 56, 56 thereof, formed with an S-shaped portion defined by oppositely curved sections 57 and 58 with the section 58 having an inner arcuate or substantially semi-cylindrical surface 59 in complementary fulcruming engagement with an outer surface 60 on a substantially semi-cylindrical portion 61 of a U-shaped saddle or fulcrum member 63 and extending between the parallel legs 62, 62 of the saddle 63, straddling a pressure plate lug-receiving opening 64 in the cover plate 65 and secured as by welds 66, 66 to the cover plate, so that the saddle is integral therewith and may be said to form an integral portion thereof in the final assembly of the cover plate and saddle. As seen in Fig. 7, the curved portion 61 of the saddle 63 extends laterally of the legs 62, 62 thereof to receive, and position its inner arcuate surface in engagement with the edge 67 of the cover plate defining the lever-receiving rectangular opening 68 therein to position the lever within the slot 69 in the pressure plate lug 70. As shown in Figure 7, two spaced dimples 73 are formed on the lever 54 and are necessary at the lever fulcrum to extend the curved surface 59 which provides the fulcrum. These two dimples are such that, in the worn position, the lever will still have some hook on the saddle counteracting the radial forces produced by centrifugal effort.

The hairpin type spring 71 is identical with the spring 47 in the embodiment of the invention shown in Figs. 1–6, inclusive, and cooperates with the cover plate and lever 54 in a similar manner to perform generally comparable functions of urging the lever into engagement with the pressure plate lugs and to hold the lever in assembly with the saddle and pressure plate. However, as the curved fulcrum surface 59 of the saddle provides the positioning means as it contacts the curved surface of the lever, the spring 71 need only exert a separating force between the cover and the lever to maintain contact between the cover and lever and it is not necessary to maintain a radial thrust to position the lever as is the spring 47 in Figs. 1–6. The radial thrust however may also exist but is not demanded.

The saddle 63 in the described release lever arrangement provides the important advantage of reinforcing the lever-supporting portion of the cover plate by distributing the load over the entire surface area of this portion of the cover plate in the assembly of the clutch and operation of the lever rather than locally as in the embodiment of the invention illustrated in Figs. 1–6, inclusive. Furthermore, the engaged curved surfaces of the lever and saddle provides large bearing areas for the lever fulcruming operation, and allows the use of greater spring pressure in the cover than when the lever is fulcrumed directly on the cover as in the embodiment of the invention illustrated in Figs. 1–6, inclusive.

While this invention has been described in detail in its preferred form or embodiment, it will be apparent to persons skilled in the art, after understanding the improvements that various changes and modifications may be made therein without departing from the spirit or scope thereof. It is aimed in the appended claims to cover all such changes and modifications.

I claim:

1. In a clutch assembly, a pressure plate having drive lugs extending laterally thereof and provided with slots therein; a cover plate having first and second angularly disposed portions, said first portion being provided with openings receiving said lugs and the said second portion being disposed radially inwardly of said first portion and having second openings disposed adjacent said drive lugs, and tongues projecting into said second openings; a plurality of levers extending through said second openings and into said slots for engagement with sides thereof and having bifurcated ends receiving said lugs and openings intermediate the ends thereof receiving said tongues for fulcruming said levers on edges of said second openings in said cover plate on opposite sides of said tongues; and means disposed between said pressure plate and said cover plate for holding said levers in engagement with said tongues on said cover plate and in operative relation with said pressure plate drive lugs.

2. In a clutch assembly, a drive plate; a driven plate; a pressure plate having axially extending lugs projecting therefrom and provided with slots; an annular cover plate connected to said drive plate and having outer radially extending portions merging with inner axially extending portions thereof, said radially extending portions having openings therein receiving said lugs for drivingly connecting said pressure and cover plates and for axial movement of said pressure plate relative to said driven plate, said axially extending portions having apertures therein radially inwardly of said lugs; a plurality of saddles integral with said cover plate and each saddle being U-shaped, leg portions of said saddles straddling said openings in said cover plate and connected to sides of said cover plate defining the openings therein, the portion of each saddle, connecting the leg portions thereof, extending laterally therefrom and within one of the apertures of the cover plate and being of generally semi-cylindrical shape for receiving and tightly engaging an edge of the cover plate defining the aperture therein; a plurality of coil springs compressed between said cover plate and pressure plate and urging said pressure plate into engagement with said driven plate; a plurality of stamped sheet metal levers within said cover plate and extending radially outward through said apertures in said axially extending portions of said cover plate and each lever being of U-shaped cross section defining a body portion and longitudinal side flanges, the body portion of the lever having a surface in complementary engagement with the semi-cylindrical portion of a saddle for pivotal movement of said lever, and the radially outer side flanges extending outwardly of the body portion thereof to define a recess in the end of the lever receiving a lug on the pressure plate with the body portion of the lever extending into the slot in a pressure plate lug; and a plurality of torsion springs connected to said levers and to said cover plate, each torsion spring having spaced pairs of legs connected by coils with one pair of said legs being connected to the radially inner edge of said cover plate, and a crosspiece connecting the other pair of legs and extending within notches in said lever flanges and urging said lever outwardly into fulcruming engagement with said saddle and urging said lever against said pressure plate lug.

3. In a clutch assembly, a drive plate; a driven plate; a pressure plate having axially extending lugs projecting therefrom and provided with slots; an annular cover plate connected to said drive plate and having outer radially extending portions merging with inner axially extending portions thereof, said radially extending portions having openings therein receiving said lugs for drivingly connecting said pressure and cover plates and for axial movement of said pressure plate relative to said driven plate, said axially extending portions having openings therein radially inwardly of said lugs, and fulcrum means on said axially extending portions of said cover plate and projecting into said openings; a plurality of coil springs compressed between said cover plate and pressure plate and urging said pressure plate into engagement with said driven plate; a plurality of stamped sheet metal levers within said cover plate and extending radially outward through said openings in said axially extending portions of said cover plate and each lever being pivotally supported intermediate the radially inner and outer ends thereof on said fulcrum means, and the radially outer end of each lever having a recess receiving a lug on the pressure plate; and a plurality of torsion springs connected to said levers and to said cover plate each torsion spring having spaced pairs of legs connected by coils, one pair of said legs being connected to the radially inner edge of said cover plate, and a crosspiece connecting the other pair of legs and extending within notches in said lever flanges and urging said lever outwardly into engagement with said fulcrum means and urging the said lever against a slot-defining side of said pressure plate lug.

4. In a clutch plate assembly, a drive plate, a pressure plate having axially extending lugs projecting therefrom provided with slot defining means, an annular cover plate having outer radially extending portions merging with radially inner axially extending portions thereof, said radially extending portions having openings therein respectively receiving said lugs for drivingly connecting said pressure and cover plates and providing for axial movement of said pressure plate relative to said drive plate, said axially extending portions having apertures therein radially inwardly of said lugs; a plurality of generally U-shaped saddles, leg portions of said saddles straddling said openings in said cover plate and connected to sides of said cover plate defining the openings therein, the portion of each saddle connecting the legs thereof extending laterally and being disposed within one of the apertures in said cover plate and being of generally semi-cylindrical shape in cross-section for receiving and tightly engaging an edge of said cover plate defining the aperture therein; a plurality of stamped sheet metal levers within said cover plate and extending radially outwardly through said apertures in said axially extending portions of said cover plate, each lever being substantially U-shaped in cross-section and including a body portion and side flanges, said lever body portion including a surface disposed in complementary engagement with said semi-cylindrical portion of a saddle whereby said levers pivot about said saddles, the radially outer portions of said side flanges extending outwardly of the body portion thereof and defining recesses in the radially outer ends of said levers which respectively receive said lugs on said pressure plates, and the body portions of said levers respectively extending into said slots in said pressure plate lugs; and a plurality of torsion springs between said pressure plate and said cover plate respectively connected to said levers and said cover plate effective to urge said levers outwardly into fulcruming engagement with said saddles and biasing said levers against said pressure plate lugs.

References Cited in the file of this patent

UNITED STATES PATENTS

| | | |
|---|---|---|
| 1,700,932 | Guay | Feb. 5, 1929 |
| 1,939,888 | Fink | Dec. 19, 1933 |
| 2,017,915 | Moorhouse | Oct. 22, 1935 |
| 2,062,102 | Nutt et al. | Nov. 24, 1936 |
| 2,120,953 | Bear | June 14, 1938 |
| 2,217,078 | Reed | Oct. 8, 1940 |
| 2,219,139 | Nutt et al. | Oct. 22, 1940 |
| 2,453,945 | Space | Nov. 16, 1948 |
| 2,773,576 | Stenger | Dec. 11, 1956 |